(12) United States Patent
Kisilev et al.

(10) Patent No.: US 7,519,222 B2
(45) Date of Patent: Apr. 14, 2009

(54) PRINT DEFECT DETECTION

(75) Inventors: Pavel Kisilev, Ma'alot (IL); Gitit Ruckenstein, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 980 days.

(21) Appl. No.: 11/036,223

(22) Filed: Jan. 14, 2005

(65) Prior Publication Data

US 2006/0158703 A1 Jul. 20, 2006

(51) Int. Cl.
*G06K 9/46* (2006.01)
(52) U.S. Cl. .................. 382/191; 382/192; 382/193; 382/194
(58) Field of Classification Search ............ 382/191, 382/192, 193, 194
See application file for complete search history.

(56) References Cited

U.S. PATENT DOCUMENTS

| 4,685,139 | A * | 8/1987 | Masuda et al. ............. 382/112 |
| 2003/0234960 | A1 * | 12/2003 | Kaltenbach et al. ........ 358/3.24 |
| 2005/0046889 | A1 * | 3/2005 | Braudaway ............... 358/1.14 |

OTHER PUBLICATIONS

Donoho, David L., et al., "Ideal Spatial Adaptation by Wavelet Shrinkage", *Biometrika*, 81(3), (Aug. 1994),425-455.
Ibrahim, Z , et al., "Performance evaluation of wavelet-based PCB defect detection and localization algorithm", *International Conference on Industrial Technology, 2002. IEEE ICIT '02. 2002 IEEE*, vol. 1, (2002),226-231.
Karras, D A., et al., "Support Vector Machines for Improved Defect Detection in Manufacturing Using Novel Multidimensional Wavelet Feature Extraction Involving Vector Quantization and PCA Techniques", *NIMIA-SC2001—2001 NATO Advanced Study Institute on Neural Networks for Instrumentation, Measurement, and Related Industrial Applications*, (2001),1-6.
Karvanen, "Measuring sparseness of noisy signals", *4th International Symposium on Independent Component Analysis and Blind Signal Separation (ICA2003)*, (Apr. 2003),125-130.
Lambert, G , et al., "Wavelet methods for texture defect detection", *International Conference on Image Processing, 1997, Proceedings.*, vol. 3, (Oct. 26-29, 1997),201-204.
Lee, C S., et al., "Feature extraction algorithm based on adaptive wavelet packet for surface defect classification", *International Conference on Image Processing, 1996. Proceedings*, vol. 1, (Sep. 16-19, 1996),673-676.
Mallat, S G., "(Book)—A wavelet tour of signal processing", *San Diego : Academic Press*, (1998).

(Continued)

*Primary Examiner*—Matthew C Bella
*Assistant Examiner*—Mike Rahmjoo (57) ABSTRACT

Systems, methods, and software to automatically detect print defects in printed matter. Some embodiments include receiving a reference image and a scanned image, wherein the reference image and the scanned image are of the same subject matter and generating a plurality of detail maps of the reference image and the scanned image at each one or more resolutions to derive one or more detail maps of each image at each resolution. The detail maps, in some embodiments, are generated by identifying differences between pixels in each of one or more directions. The embodiments further include dividing the detail maps of each image into blocks of equal image proportion and calculate an activity measure of each block in each of the detail maps. These embodiments further calculate similarity measures between the blocks of reference image detail maps and the respective blocks of the scanned image detail maps.

11 Claims, 5 Drawing Sheets

OTHER PUBLICATIONS

Mallat, S., et al., "Singularity detection and processing with wavelets", *IEEE Transactions on Information Theory*, 38(2), (Mar. 1992),617-643.

Unser, M, "Texture classification and segmentation using wavelet frames", *IEEE Transactions on Image Processing*, 4(11), (Nov. 1995),1549-1560.

* cited by examiner

PRINT DEFECT DETECTION

BACKGROUND

Detecting defects within printed material has generally been a manual process. In such a case, a person manually views a printed item to see if any defects are apparent. This can be a time consuming and expensive process.

Some methods exist for using scanning technology to detect print defects. However, these methods use precise spatial and intensity alignments and are sensitive to even small noise perturbations. This results in a high rate of false defect detections and detection of acceptable defects that would not be considered defects. Further, some such detected defects may not even be perceivable by a person.

Other methods exist to detect texture defects in prints or on surfaces. However, these methods do not work well with printed items containing various types of content, including pure line art works, natural images, text, and combined documents.

DETAILED DESCRIPTION

In the following detailed description, reference is made to the accompanying drawings that form a part hereof, and in which is shown by way of illustration specific embodiments in which the inventive subject matter can be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware, or any combination thereof. Multiple functions are performed in one or more modules as desired, and the embodiments described are merely examples. The software is executed on a digital signal processor, ASIC, microprocessor, or other type of processor that can be either a part of the press or printer, or operating on an external system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Some embodiments herein present schemes for automatic detection of print defects. Some printers and presses, such as Hewlett-Packard's Indigo's presses, the defect detection task currently requires a skilled operator to manually inspect prints. To remove this operator inspection, various embodiments place hardware and/or software on the press or printer, or on other systems operatively coupled to the press or printer, to automatically detect print defects and alert the operator.

Throughout the following description, the terms "press" and "printer" are used interchangeably. Any reference to either "press," "printer," or similar terms is not intended to limit the scope of this description and the other terms can be substituted therefore without departing from the breadth of this disclosure.

According to one system embodiment, the system compares a digital image of a print job to a scanned digital image of printer output. Appropriate image acquisition equipment, either built-in to the printer or external to it, scans the prints as they depart the printing portion of the printer. Scanned images, in some embodiments, are preprocessed, to align and filter the images. Such preprocessing is sometimes referred to as registering the images. This optional preprocessing such that the scanned and reference images can be compared with greater accuracy. Defect detection algorithms are then applied, creating error maps that are then supplied to a decision function to provide fast and simple defect detection. In some embodiments, this defect detection finds major print defects with a very low false alarm rate utilizing sparse image representations, e.g. wavelets. In some embodiments, sparsity, sometimes referred to as activity, measures are used as a similarity measure of the two images.

In another embodiment within a press, a print is compared to the digital input it is intended to reproduce. The scanned prints from the press can contain various types of content, including pure line art works, natural images, and combined documents. Typical defects that cause an operator manually inspecting prints to stop the press include scratches, spots, missing dot clusters, ink smears, etc. The defect detection algorithm can detect these defects without assuming any specific size, shape, or type of defect.

However, some other embodiments focus on detection of medium to high contrast defects of various sizes, e.g., scratches, large blotches of redundant ink, bright spots caused by missing ink, etc. Some such embodiments are not sensitive to minor defects such as small dots and very dim fine scratches. One advantage of this embodiment is the fact that the detection algorithm does not find minute defects or dust shades captured during scan that do not actually appear within an actual print.

Each scanned image may be viewed as an output of a hypothetical "optical transformation" applied to a perfect digital input image. This "optical transformation" is the result of the printing and scanning of the print output. This optical transformation can introduce at least two types of "misalignments." These misalignments are in the spatial domain, causes by paper rotation, sheer, and stretch, and in the intensity domain, caused by varying conditions of print and scan, e.g., slight color printing inconsistencies, inconsistent illumination, and scanning blur. While a good registration can compensate for most of the spatial misalignments, the intensity domain differences make the two images inherently different. Thus, in various embodiments, the print defect detection method is invariant to optical transformation from scanning and is able to distinguish between transformation-based changes and print defects. In addition, since registration is not perfect, various embodiments also cope with spatial misalignments.

Further, because defects are commonly localized and relatively small, such defects minimally affect any global similarity measure. Therefore, the approach in various embodiments is based on dividing both the reference and scanned images into respective local regions, such as blocks, and comparing features of corresponding blocks. In some such embodiments, to extract features within blocks, a wavelet transform (WT) is applied to both images to generate the so-called detail maps. The wavelet transform can include one or more wavelet transforms such as the Discrete Wavelet Transform (DWT), the Stationary Wavelet Transform (SWT), or Shift-invariant Wavelet Transform. Coefficients at various resolution levels, or scales, represent image features such as edges, texture, etc. Next, the detail maps of WT coefficients are divided into blocks, and an activity related measure, namely sparsity, is computed for every block. This activity measure represents the proportion of high magnitude features in the selected block. Evidence for the presence of defects is given by a relatively large difference of the activity values of respective local blocks in the two images.

Because the measures in some of the above embodiments are cumulative (i.e., computed from overall block statistics), they are not sensitive to spatial misalignments inside a block. Thus, to avoid false alarms caused by spatial misalignments around the block boundaries, some embodiments include computing the local measure based on blocks of various size and shift covering a given region. Robustness against the "optical transformation" in these embodiments is achieved by defining the activity measure based on local contrast and local noise level. In particular, the threshold separating high magnitude features from the low ones is computed based on a local noise variance estimate.

In order to detect defects of various sizes, some embodiments include computing local activity measures for various scales of WT coefficients. Local activity difference maps corresponding to various scales are combined into a single map by applying various arithmetic operations, such as averaging the values of the regions from the various scales. The resulting map marks blocks containing defects from which an operator can optionally be notified of actual or possible defects.

Figure 1:
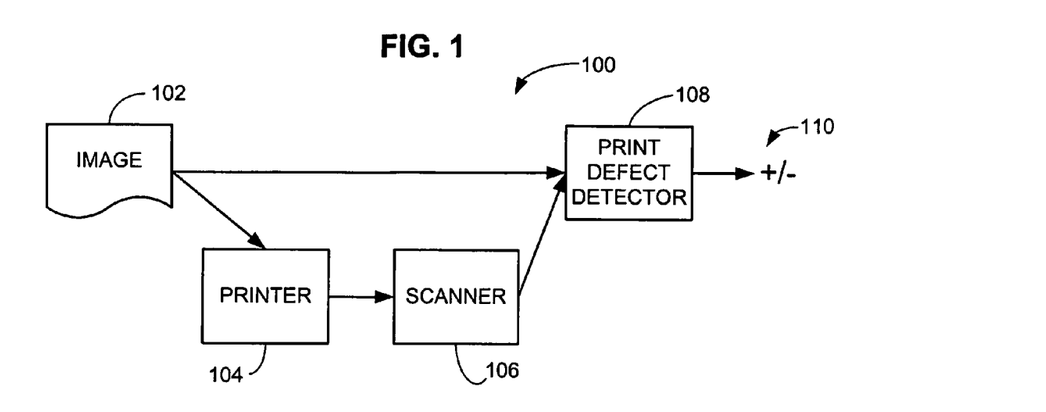
FIG. 1 is a block diagram of a system according to an example embodiment.

FIG. 1 is a block diagram of a system 100 according to an example embodiment. The system 100 includes a digital reference image that is sent to a printer 104 and to a print defect detector 108. The printer 104, upon receipt of the image 102, prints the image 102 and forwards the print onto a scanner 106. The scanner 106 scans the print and forwards a scanned image onto the print defect detector 108. The print defect detector 108 then performs an analysis on the image 102 and the scanned image received by from the scanner 106. Upon completion of the analysis, the print defect detector 108 outputs a signal 110 indicating whether there are defects in the scanned image from the scanner 106.

The image 102, in various embodiments, is any image capable of printing. The image can be encoded as a bit map, a TIFF image, a JPEG image, a GIF image, or any other image capable of being printed. Further, the image 102 can be encoded in any of the various print control languages that instruct printers in the production of documents.

The printer 104, in various embodiments, is a laser printer, an ink jet printer, a digital printing press, an offset printing press, or virtually any other print or press machine capable of printing digital images.

The scanner 106 scans printed documents and generates digital images of the scanned documents. The scanner 106, in various embodiments, is a sheet-feed scanner, a flatbed scanner, a line scanner, or virtually any other scanning device.

The print defect detector 108 includes hardware and/or software to compare the image 102 with a scanned image received from the scanner 106. In some embodiments, the printer 104, the scanner 106, and the print defect detector 108 are encapsulated within a single printing device, such as a printer or a printing press. In other embodiments, the printer 104, the scanner 106, and the print defect detector 108 are encapsulated within two or more interconnected devices.

Figure 2:
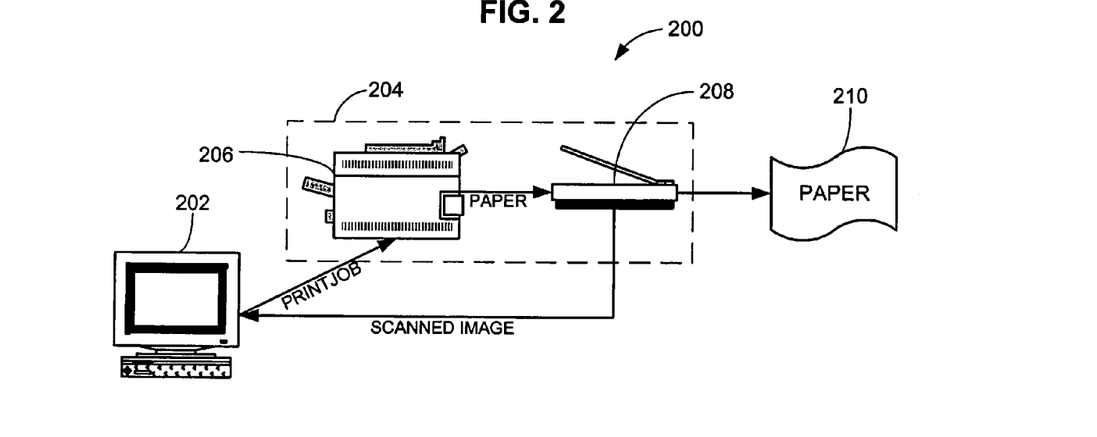
FIG. 2 is a block diagram of a system according to an example embodiment.

FIG. 2 is a block diagram of a system 200 according to an example embodiment. The system 200 includes a workstation 202 and a print device 204. The system 200 is operable to print digital images, ensure quality of printed digital images, and output the digital images on paper 210, or other substrates.

The print device 204 includes a printing module 206 and a scanning module 208. In operation, the printing module 206 receives a print job from the workstation 202 and prints the print job on paper, or other substrate. Prints output by the printing module 206 are then forwarded to the scanning module 208. The scanning module 208 scans the print job, generates a scanned image in a digital format of each page of the print job, and outputs the paper, or other substrate on which the printing module 206 printed the print job. The scanning module 208 further forwards the scanned image to the workstation 202.

The workstation 202, in some embodiments, is a personal computer operatively coupled to the print device 204. In other embodiments, the workstation 202 is a print device 204 operator front-end to use in controlling the print device 204. The workstation 202 includes at least one processor to perform print defect detection according to an instruction set stored on and operable from a memory within the workstation 202. In some embodiments, the workstation 202 further includes a display on which the software optionally displays detected print defects to a system 200 operator.

In operation, the workstation 202 generates a print job and communicates the print job to the printing module 206 of the print device 204. The workstation 202 generates the print job from electronic documents or digital images. When print jobs are generated from electronic documents, the workstation 202 further generates a digital image of each page to be printed. The digital images are then held in a memory of the workstation to use in print defect detection.

The workstation 202 performs print defect detection on scanned images received from the scanning module 208 according to the instructions stored in the memory of the workstation 202. In some embodiments, the print defect detection is performed according to a multi-resolution, block-by-block, block features adaptive algorithm using the digital image of a print job as a reference image to compare against a scanned image received from the scanning module 208 of the print device 204. The algorithm includes detecting a print image defect by comparing block activity measures of the reference image to block activity measures of a scanned print image. Higher differences between the block activity measures indicate a higher probability of a print defect. The block activity measures, in some embodiments are calculated at multiple resolutions. In some cases, the instructions can cause the reference image and the scanned image to be downsampled prior to subsequent block activity measure calculation. Further details of the print defect detection algorithms are described below.

Figure 3:
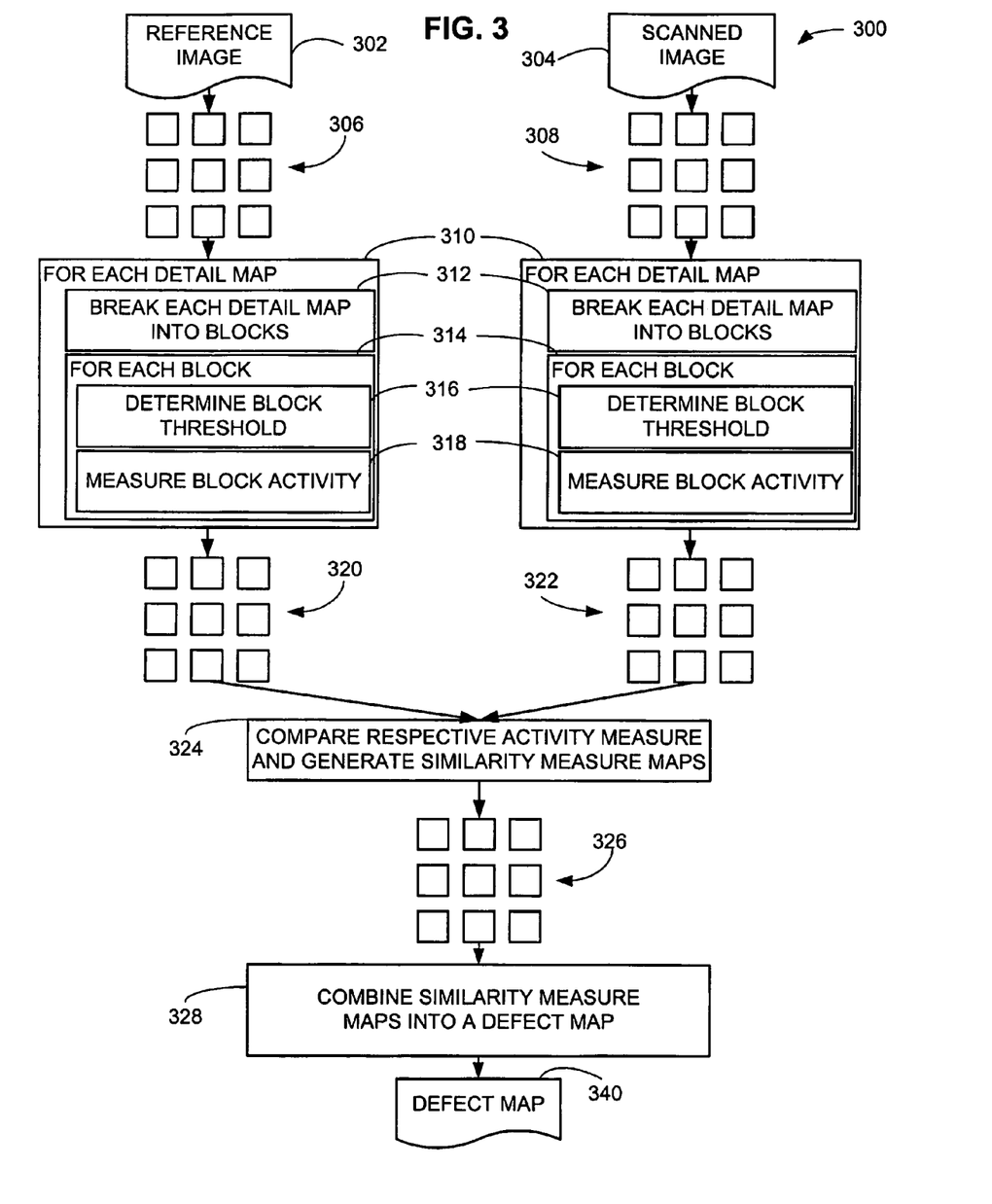
FIG. 3 is a block flow diagram of a method according to an example embodiment.

FIG. 3 is a block flow diagram of a method 300 according to an example embodiment. The method 300, in some embodiments, is encoded as instructions on a device readable medium to cause an information-processing device, such as workstation 202 of FIG. 2, to detect print defects. The method 300 includes receiving a reference image 302 and a scanned image 304. The scanned image 304 is scanned from a document intended to represent the same content as the reference image.

The method 300 applies sparse image transformation to both of the reference image 302 and the scanned image 304, yielding three maps at each of three different resolutions to generate detail maps 306 and 308. In the case of a simple sparse image transformation, the detail maps are generated by identifying differences between adjacent pixels in each of one or more directions, such as a horizontal direction, a vertical direction, and a diagonal direction. When differences are identified in each of a horizontal, a vertical, and a diagonal direction, three maps are generated of both the reference image 302 and the scanned image 304. The reference image 302 and the scanned image 304 are then downsampled and differences between adjacent pixels are again identified to generate three more maps. In some embodiments, the downsampling of the images and differences between adjacent pixels is performed once more. In the present embodiment, this results in nine detail maps 306 of the reference image and nine detail maps 308 of the scanned image. In the case of a more sophisticated, wavelet transform based, sparse image transformation, similar nine maps are obtained. Further details and embodiments of the downsampling of the reference image 302 and the scanned image 304 are described below with reference to FIG. 5.

Other embodiments include breaking both of the reference image 302 and the scanned image 304 into one or more maps at each of one or more resolutions to generate one or more detail maps 306 and 308 for each of the reference image 302 and the scanned image 304.

Next, activities 310 are performed on the detail maps 306 and 308 of each image 302 and 304 in the present embodiment. These activities 310 includes breaking each of the nine reference image detail maps 306 and the nine scanned image detail maps 308 into blocks of equal image proportion. The equal proportion of the blocks compensates for possible variation of image 306 and 308 resolutions.

The activities 310 performed on the detail maps 306 and 308 further include processing 314 each block. This processing 314 includes determining a block threshold 316 for each individual block within each of the detail maps 306 and 308 and measuring block activity 318. A block activity measure is a coefficient that represents the proportion of high magnitude features in the selected block. The block activity measures are then placed in activity maps 320 and 322. The activity maps 320 and 322 include a block activity measure for each block of each of the detail maps 306 and 308. For example, there are activity maps for both the reference image 302 and the scanned image 306 at each resolution for horizontal, vertical, and diagonal pixel differences. This results in horizontal, vertical, and diagonal activity maps at each of the three resolutions for each of the reference image 302 and the scanned image 304. However, the difference between the detail maps 306 and 308 and the activity maps 320 and 322 is that the activity maps 320 and 322 have the pixels grouped in blocks and the values of the differences between adjacent pixels are replaced by a single value for each block representative of an activity measure for the block. Further details and embodiments of the processing 314 of each block are described below with reference to FIG. 4A.

The method 300 further includes comparing 324 respective activity measures from the blocks of respective activity maps 320 and 322 to generate similarity measure map set 326. This comparing 324 includes a block-by-block comparison of blocks from respective maps. For example, the map of horizontal activity of the reference image 302 at the highest resolution is compared against the map of horizontal activity of the scanned image 304 at the highest resolution. The comparing includes subtracting the block activity values of one set of activity maps from the block activity values of the other set of activity maps. This provides a map of similarities between the activity maps 320 and 324. For example, the block activity values of the scanned image 304 activity maps 320 can be subtracted from the block activity values of the reference image 302 activity maps 322. The resulting values from this subtraction are placed in the similarity measure map set 326 which include horizontal, vertical, and diagonal similarity measure maps for each of the three resolutions.

The similarity measure map set 326 is then combined 328 into a single defect map 340. The respective blocks within the similarity measure map set 326 are combined into a single block within the defect map 340. The values of respective blocks from each of the nine maps within the similarity measure map set 326 are averaged in some embodiments to provide a block value for the defect map 340. In other embodiments, the maximum value of a respective block in the block value for the defect map 340 is calculated. Other embodiments include block values for the defect map 340 derived from various other mathematical formulas and statistical methods based upon the block values within the similarity measure map set 326.

The defect map 340 can then be used to trigger alarms within a printing system to notify a printing system operator of print defects. Other embodiments include automatically excepting a printed document with a detected defect and reprinting the document.

Some further embodiments include breaking each detail map into blocks 312 of two or more sizes and processing 314 the blocks of the different sizes independent of the other blocks. Such embodiments include generating a number of sets of activity maps 320 and 322 equal to the number of block sizes. The block activity measures of the activity maps of each block size are compared 324 against the blocks of their respective block size activity maps and combined into a similarity measure map set 326. This results in a number of similarity measure map sets 326 equal to the number of block sizes utilized in the particular embodiment. All of the similarity measure map sets 326 are then combined 328 into a single defect map.

Figure 4A:
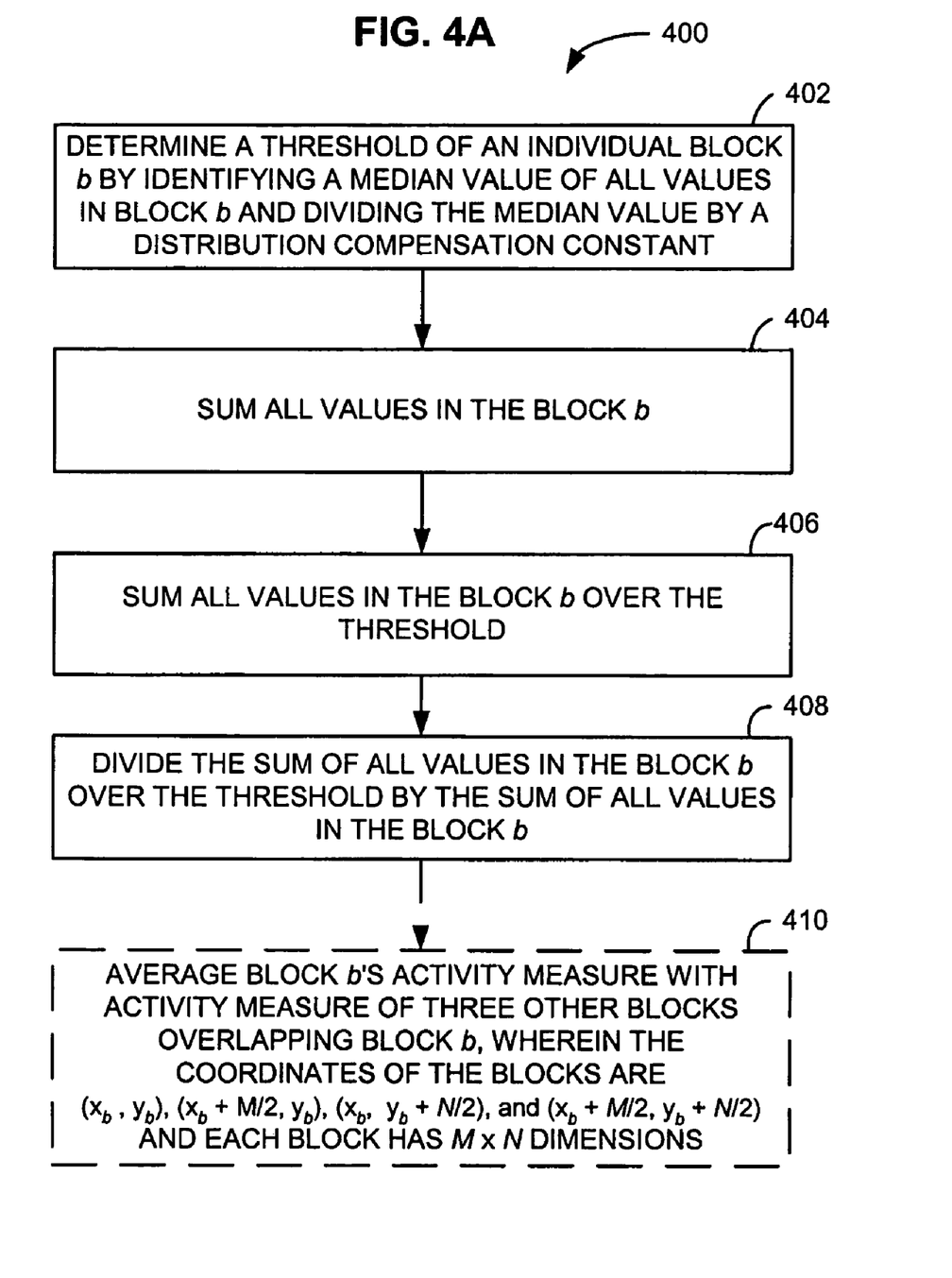
FIG. 4A is a block diagram of a method according to an example embodiment.

FIG. 4A is a block diagram of a method 400 according to an example embodiment. The method 400 is used to derive an activity measure of a block of adjacent pixel value differences. The adjacent pixel value differences are obtained, as in the method 300 of FIG. 3, by subtracting the value, or values in the case of red, green, blue (RGB) channels, of one pixel from the value of an adjacent pixel in either a horizontal, vertical, or diagonal direction. The result of the subtracting is then substituted for the pixel value, or values. The blocks are obtained in a similar manner as described above with reference to method 300 of FIG. 3.

Returning to FIG. 4A, the method 400 includes determining a threshold of an individual block b by identifying a median value of all values in block b and dividing the median value by a distribution compensation constant 402 and summing all values in the block b 404. Although, the median value is used in this embodiment, other embodiments utilize other statistically significant values. One such value is a mean value of all values in block b. The method 400 further includes summing all values in the block b over the threshold 406 and dividing that sum by a sum of all values in the block b 408. This method provides a block activity measure which is a coefficient that represents the proportion of high magnitude features in the selected block. Embodiments utilizing this block activity measure method are robust against "optical transformation", because the method defines the activity measure based on block specific contrast and noise levels.

In some embodiments, the distribution is assumed a Gaussian distribution and the compensation constant is 0.6745. In other embodiments, other distributions and respective distribution compensation constants can be assumed and utilized. Further, multidimensional distributions can be utilized in embodiments requiring more than two dimensions.

Some embodiments of the method 400 further include an optional element. This optional element includes averaging block b's activity measure with activity measures of three other blocks overlapping block b 410. In such embodiments, each of block b and the overlapping blocks have the same dimensions represented by M×N. The coordinates of block b are $(x_b, y_b)$. The coordinates of the other three blocks are $(x_b+M/2, y_b)$, $(x_b, y_b+N/2)$, and $(x_b+M/2, y_b+N/2)$. Activity measures for block b and the other three blocks are determined according to the method 400 and summed. The sum of the blocks is then divided by four to derive the average activity measure. This activity measure is then used as the activity measure for block b. The use of this average activity measure adds robustness to embodiments utilizing the method 400 when a reference image and a scanned image are not perfectly aligned in the spatial domain and image feature occur at the edges of blocks.

Figure 4B:
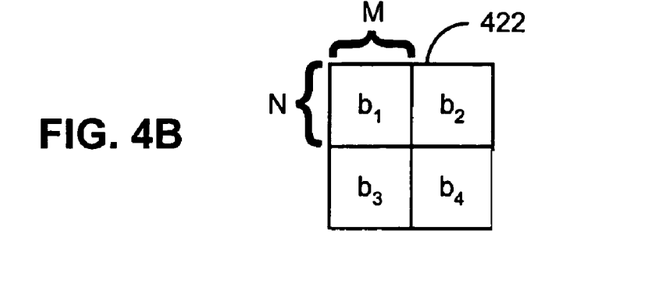
FIG. 4B is a diagram of pixel blocks according to an example embodiment.

An example illustration of the four averaged block is provided in FIG. 4B-FIG. 4F. FIG. 4B-FIG. 4F are diagrams of pixel blocks according to an example embodiment. FIG. 4B includes a set of blocks 422 each having M×N dimensions. The set of blocks 422 includes four blocks $b_1$, $b_2$, $b_3$, and $b_4$. Block $b_1$ is the block for which an average activity measure will be calculated. The shaded areas of FIG. 4C-FIG. 4F illustrate the blocks that will be averaged to derive the activity measure for block $b_1$.

Figure 4C:
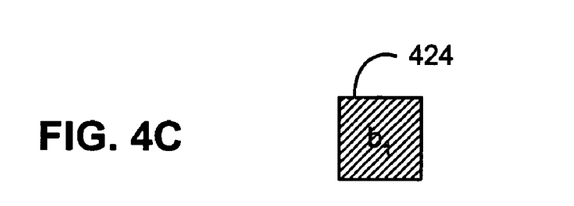
FIG. 4C is a diagram of a pixel block according to an example embodiment.
Figure 4D:
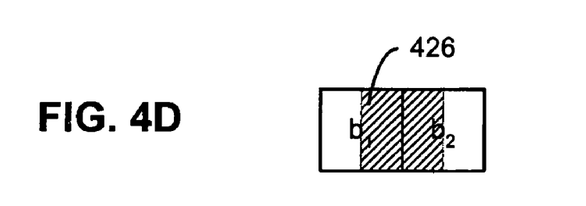
FIG. 4D is a diagram of pixel blocks according to an example embodiment.
Figure 4E:
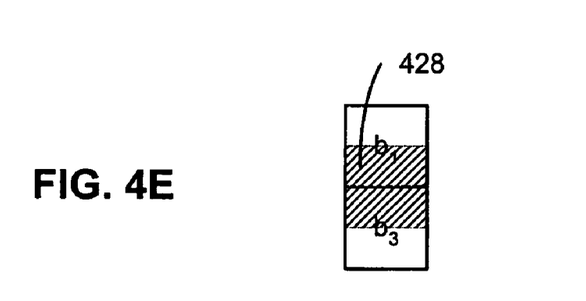
FIG. 4E is a diagram of pixel blocks according to an example embodiment.
Figure 4F:
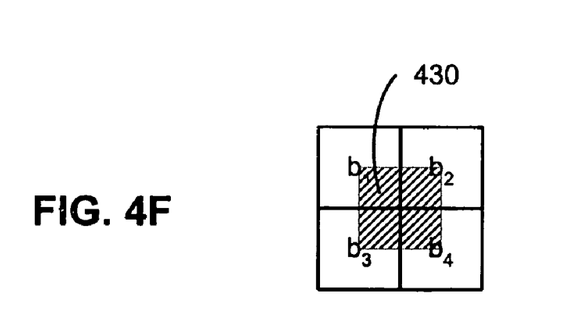
FIG. 4F is a diagram of pixel blocks according to an example embodiment.

First, FIG. 4C illustrates that the activity measure of block $b_1$ 424 will be included in the average. FIG. 4D illustrates that shifting M/2 on the X-axis provides the shaded block 426 to include in the average. FIG. 4E illustrates that shifting N/2 on the Y-axis provides the shaded block 428 to include in the average. Finally, FIG. 4F illustrates that shifting M/2 on the X-axis and N/2 on the Y-axis provides block 430 to include in the average. Thus, the sum of blocks 424, 426, 428, and 430 divided by four provides the average activity measure for block $b_1$ according to element 410 of the method 400 of FIG. 4A.

Figure 5:
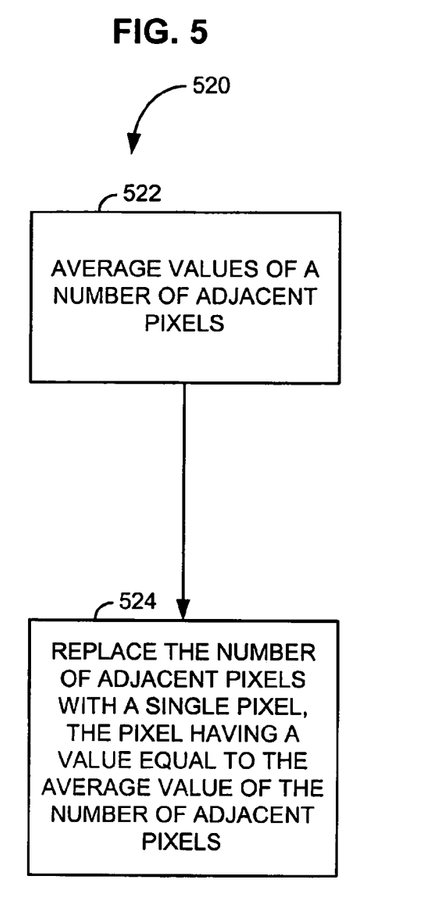
FIG. 5 is a block diagram of a method according to an example embodiment.
Figure 5A:
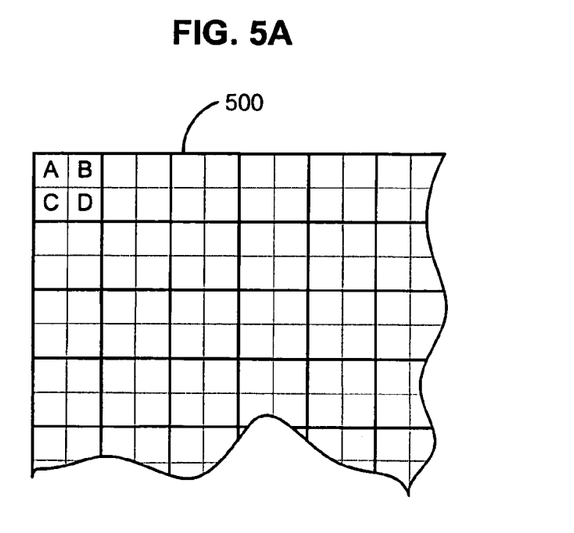
FIGS. 5A and 5B illustrate a pixel grid and a downsampled pixel grid, respectively, according to an example embodiment.
Figure 5B:
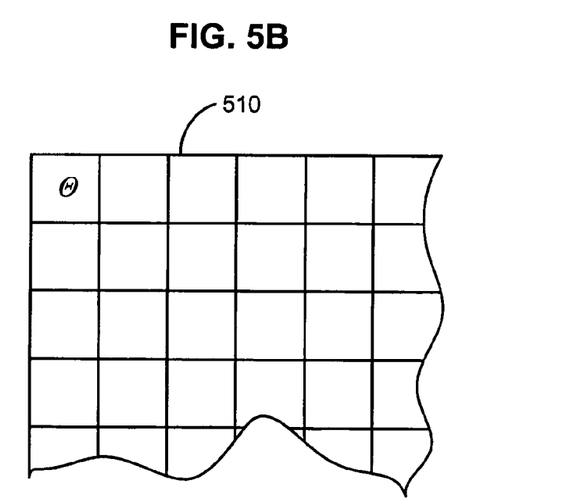

FIG. 5 is a block diagram of a method 520 according to an example embodiment. The method 520 is a method of dyadic downsampling of a group of pixel values to a single pixel value, thus reducing the resolution of an image. FIGS. 5A and 5B illustrate a pixel grid 500 and a downsampled pixel grid 510, respectively, according to an example embodiment.

The method 520 includes averaging values of a number of adjacent pixels at block 522 and replacing the number of adjacent pixels with a single pixel at block 524, the pixel having a value equal to the average value of the number of adjacent pixels. Averaging the values of a number of adjacent pixels A, B, C, and D of the pixel grid 500 includes summing the values and dividing by 4, and is represented by the formula: $\Theta=(A+B+C+D)/4$. The resulting average value $\Theta$ replaces the values of pixels A, B, C, and D in a downsampled pixel grid 510 illustrated in FIG. 5B.

It is emphasized that the Abstract is provided to comply with 37 C.F.R. § 1.72(b) to allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this inventive subject matter may be made without departing from the principles and scope of the inventive subject matter as expressed in the subjoined claims.

What is claimed is:

1. A device readable medium, with instructions thereon, to cause an information-processing device to:
   generate a plurality of detail maps of a reference image at each of a plurality of resolutions, wherein the reference image detail maps represent changes between adjacent pixels;
   generate a plurality of detail maps of a scanned image at each of the plurality resolutions, wherein the scanned image is generated by scanning a print of the reference image, further wherein the scanned image detail maps represent changes between adjacent pixels;
   break each detail map into blocks of equal proportion;
   calculate an activity measure of each block in each detail map;
   measure similarities between respective detail map blocks to derive similarity maps; and
   combine the similarity maps into a single map of similarity measures, wherein a higher similarity measure indicates a higher probability of a print defect.

2. The device readable medium of claim 1, wherein the instructions to generate the plurality of detail maps includes instructions to generate a detail map representative of differences between pixels in each of a plurality of directions.

3. The device readable medium of claim 1, wherein the instructions to generate the plurality of detail maps of the reference image and the scanned image further include instructions to equally downsample both of the reference image and the scanned image one or more times.

4. The device readable medium of claim 3, wherein instructions to downsample the reference image and the scanned image further cause the device to:
   average values of a number of adjacent pixels; and
   replace the number of adjacent pixels with a single pixel, the single pixel having a value equal to the average value of the number of adjacent pixels.

5. The device readable medium of claim 1, wherein the instruction to combine the similarity maps into a single map further include instruction to average similarity measures of the respective blocks between all of the similarity maps.

6. The device readable medium of claim 1, wherein the instructions to calculate an activity measure of each block further include instructions to cause the information-processing device to:
   determine a threshold of an individual block; and
   sum all values in the block over the threshold and dividing that sum by a sum of all values in the block.

7. The device readable medium of claim 6, wherein the instructions to determine a threshold of an individual block further include instructions to cause the information-processing device to:
   identify a median value of all values in the block; and
   divide the median value by a distribution compensation constant.

8. The device readable medium of claim 4, wherein the distribution is a Gaussian distribution and the compensation constant is 0.6745.

9. The device readable medium of claim 1, wherein the instructions to calculate an activity measure of each block further includes instructions to cause the information-processing device to:
   calculate an average activity measure of a block b having M×N dimensions by averaging the block b's activity measure with activity measures of three other blocks overlapping block b, wherein the other three block are defined by the coordinates $(x_b+M/2, Y_b)$, $(X_b, Y_b+N/2)$, and $(x_b+M/2, Y_b+N/2)$;
   wherein calculating an activity measure of each block to use in averaging includes:
      determining a threshold of the block, wherein determining the threshold includes:
         identifying a statistically significant value of all values in the block, and
         dividing the statistically significant value by a distribution compensation constant; and
      dividing a sum of all pixel values in the block greater than the threshold by a sum of all pixel values in the block.

10. The device readable medium of claim 9, wherein the distribution is a Gaussian distribution and the compensation constant is 0.6745.

11. The device readable medium of claim 9, wherein the statistically significant value is a median value.

* * * * *